US009478827B2

(12) United States Patent
Shim et al.

(10) Patent No.: US 9,478,827 B2
(45) Date of Patent: Oct. 25, 2016

(54) NON-AQUEOUS ELECTROLYTE SOLUTION FOR LITHIUM SECONDARY BATTERY AND LITHIUM SECONDARY BATTERY INCLUDING THE SAME

(71) Applicant: LG Chem, Ltd., Seoul (KR)

(72) Inventors: You Jin Shim, Daejeon (KR); Jae Seung Oh, Seoul (KR); Yeon Suk Hong, Daejeon (KR); Byoung Bae Lee, Daejeon (KR); Hyo Jin Lee, Daejeon (KR)

(73) Assignee: LG Chem, Ltd. (KR)

( * ) Notice: Subject to any disclaimer, the term of this patent is extended or adjusted under 35 U.S.C. 154(b) by 477 days.

(21) Appl. No.: 13/966,632

(22) Filed: Aug. 14, 2013

(65) Prior Publication Data

US 2013/0330598 A1 Dec. 12, 2013

Related U.S. Application Data

(63) Continuation of application No. PCT/KR2013/000726, filed on Jan. 30, 2013.

(30) Foreign Application Priority Data

May 8, 2012 (KR) ........................ 10-2012-0048652

(51) Int. Cl.
*H01M 10/0567* (2010.01)
*H01M 10/052* (2010.01)
(Continued)

(52) U.S. Cl.
CPC ....... *H01M 10/0567* (2013.01); *H01M 10/052* (2013.01); *H01M 10/056* (2013.01);
(Continued)

(58) Field of Classification Search
CPC .................. H01M 10/0567; H01M 10/0568; H01M 10/0569; H01M 10/052; H01M 4/505; H01M 4/525; H01M 2300/0037; H01M 2300/004; H01M 2300/0034; Y02E 60/122; Y02T 10/7011
See application file for complete search history.

(56) References Cited

U.S. PATENT DOCUMENTS

| | | | |
|---|---|---|---|
| 2006/0035144 A1* | 2/2006 | Shimizu | H01M 10/0525 429/231.95 |
| 2009/0047582 A1 | 2/2009 | Kim et al. | |

(Continued)

FOREIGN PATENT DOCUMENTS

| | | |
|---|---|---|
| CN | 101626098 A | 1/2010 |
| EP | 2120279 A1 | 11/2009 |

(Continued)

OTHER PUBLICATIONS

Supplemental Search Report from European Application No. 13750618.4, dated Sep. 7, 2015.
(Continued)

*Primary Examiner* — Laura Weiner
(74) *Attorney, Agent, or Firm* — Lerner, David, Littenberg, Krumholz & Mentlik, LLP

(57) ABSTRACT

A non-aqueous electrolyte solution for a lithium secondary battery and a lithium secondary battery including the same are provided. The non-aqueous electrolyte solution includes an organic solvent, an ionizable lithium salt, a dinitrile compound including an ether bond represented by Chemical Formula 1, and an aliphatic dinitrile compound represented by Chemical Formula 2. The lithium secondary battery including the non-aqueous electrolyte solution having the possibility of generating a swelling phenomenon while storing or charging/discharging at a high temperature may be restrained. In addition, a cycle life of the charging/discharging may be improved.

10 Claims, 1 Drawing Sheet

(51) Int. Cl.
  *H01M 10/056*   (2010.01)
  *H01M 10/0568*  (2010.01)
  *H01M 10/0569*  (2010.01)
  *H01M 4/505*    (2010.01)
  *H01M 4/525*    (2010.01)

(52) U.S. Cl.
  CPC ..... *H01M10/0568* (2013.01); *H01M 10/0569* (2013.01); *H01M 4/505* (2013.01); *H01M 4/525* (2013.01); *H01M 2300/004* (2013.01); *H01M 2300/0034* (2013.01); *H01M 2300/0037* (2013.01); *Y02E 60/122* (2013.01); *Y02T 10/7011* (2013.01)

(56) References Cited

U.S. PATENT DOCUMENTS

2011/0052980 A1  3/2011  Sakata et al.
2013/0157116 A1* 6/2013  Hong .................. H01M 10/052
                                                     429/163

FOREIGN PATENT DOCUMENTS

| JP | H11-185808 A | 7/1999 |
| JP | 2005-267857 | 9/2005 |
| KR | 10-2009-0039211 A | 4/2009 |
| KR | 10-2012-0016019 A | 2/2012 |
| WO | 2012/021029 A2 | 2/2012 |

OTHER PUBLICATIONS

International Search Report from PCT/KR2013/000726, dated May 27, 2013.
Office Action from Chinese Application No. 201380000913.7, dated Apr. 13, 2015.
Office Action from Chinese Application No. 201380000913.7, dated Jul. 11, 2016.

* cited by examiner

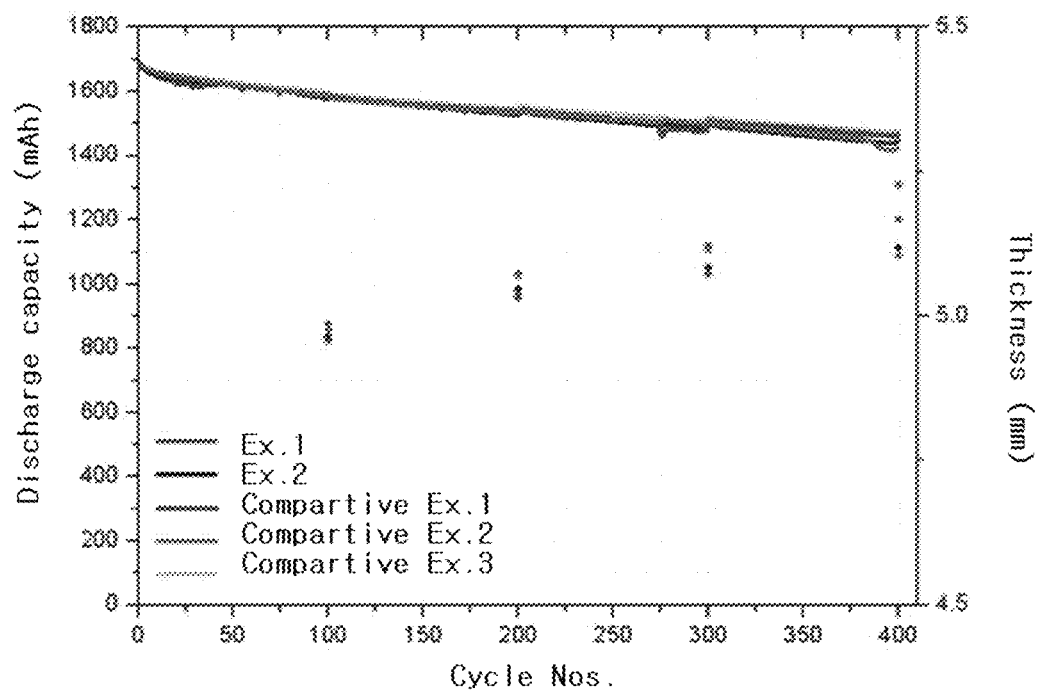

NON-AQUEOUS ELECTROLYTE SOLUTION FOR LITHIUM SECONDARY BATTERY AND LITHIUM SECONDARY BATTERY INCLUDING THE SAME

CROSS-REFERENCE TO RELATED APPLICATIONS

The present application is a continuation of International Application No. PCT/KR2013/000726 filed on Jan. 30, 2013, which claims priority to Korean Patent Application No. 10-2012-0048652, filed on May 8, 2012 in the Republic of Korea, the disclosures of which are incorporated herein by reference.

BACKGROUND OF THE INVENTION

1. Field of the Invention

The present invention relates to a non-aqueous electrolyte solution for a lithium secondary battery having the possibility of generating a swelling phenomenon after storing for a long time and conducting a charging/discharging cycle at a high temperature may be effectively restrained, and a lithium secondary battery including the same.

2. Description of the Related Art

Recently, interest on an energy storage technique has been gradually increased. According to the enlargement on an application field of the energy storage technique including a cellular phone, a camcorder, a notebook pc, and even electric vehicles, requirements on the high energy densification of a battery used as a power source of electronic devices have been increased. A lithium secondary battery is a kind of a battery satisfying the requirements best, and researches on the lithium secondary battery have been actively conducted nowadays.

Among the secondary batteries presently used, the lithium secondary battery developed at the early in 1900 includes an anode formed by using a carbon material absorbing and desorbing lithium ions, a cathode formed by using an oxide including lithium and a non-aqueous electrolyte solution obtained by dissolving an appropriate amount of a lithium salt into an organic solvent mixture.

As the application of the lithium secondary battery has been expanded, a demand on a lithium secondary battery maintaining a good performance under a severe condition such as a high temperature or a low temperature, and having a safe charging at a high voltage has been gradually increased.

However, the structural stability and capacity of a lithium transition metal oxide or a complex oxide used as the active material of the cathode of the lithium secondary battery may be determined by the absorption and desorption of lithium ions. The capacity may be increased as the charging voltage increases. In this case, the desorption of the transition metal constituting the active material may be accelerated to induce structural instability.

The organic solvent commonly used in the non-aqueous electrolyte solution may include ethylene carbonate, propylene carbonate, dimethoxyethane, gamma butyrolactone, N,N-dimethyl formamide, tetrahydrofurane, acetonitrile, etc. However, when storing these organic solvents at a high temperature for a long time, the electrolyte solution may be oxidized to generate a gas. Then, a swelling phenomenon may be generated to deteriorate the battery. In this case, the thus decomposed and generated gas may deform a pouch type or a can type battery assembly to induce an internal short. In severe cases, the battery may ignite or be exploded. The oxidation of the electrolyte solution may be accelerated by the transition metal eluted under a high voltage condition.

In order to solve the above described defects, addition of various additives into the non-aqueous electrolyte solution has been suggested to prevent the swelling of the battery. Until now, an effective solution has not been suggested.

SUMMARY OF THE INVENTION

An aspect of the present invention is solving technical objects and providing a non-aqueous electrolyte solution for a lithium secondary battery restraining the swelling phenomenon of the battery and improving a charging/discharging cycle lifetime, and a lithium secondary battery including the same.

According to an aspect of the present invention, there is provided a non-aqueous electrolyte solution including an organic solvent, an ionizable lithium salt, a dinitrile compound including an ether bond represented by following Chemical Formula 1, and an aliphatic dinitrile compound represented by following Chemical Formula 2.

[Chemical Formula 1]

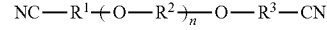

[Chemical Formula 2]

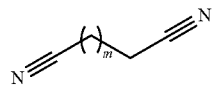

In Chemical Formulae 1 and 2, $R_1$, $R_2$ and $R_3$ independently represents an alkylene having 1 to 5 carbon atoms or an alkenyl having 2 to 5 carbon atoms, n represents an integer of 1 to 5, and m represents an integer of 1 to 3.

According to another aspect of the present invention, there is provided a lithium secondary battery including an electrode assembly including a cathode including a cathode active material, an anode and a separator interposed between the cathode and the anode, a battery container receiving the electrode assembly, and a non-aqueous electrolyte solution for the lithium secondary battery injected in the battery container.

The non-aqueous electrolyte solution according to the present invention has an excellent effect on restraining the swelling phenomenon of a battery. Particularly, the swelling phenomenon possibly generated when storing the battery at a high temperature may be solved by using a non-aqueous electrolyte solution including a dinitrile compound having an ether bond. The swelling phenomenon possibly generated while repeatedly charging/discharging at a high temperature may be solved by adding an aliphatic dinitrile compound such as succinonitrile in the non-aqueous electrolyte solution.

BRIEF DESCRIPTION OF THE DRAWINGS

The above and other aspects, features and other advantages of the present invention will be more clearly understood from the following detailed description taken in conjunction with the accompanying drawings, in which:

FIG. 1 is a graph illustrating results on a thickness change of a secondary battery including the electrolyte solution in accordance with example embodiments when charging/discharging at a high temperature according to Experiment 2.

DETAILED DESCRIPTION OF THE PREFERRED EMBODIMENT

Exemplary embodiments of the present invention will now be described in detail with reference to the accompanying drawings. It is noted that terms or words used in the specification and claims should not be limited to the dictionary definition, but should be construed as meanings or concepts corresponding with the technical sprit of the present invention, based on the principle that the inventor can appropriately define the concepts of the terms to best describe his own invention.

The non-aqueous electrolyte solution according to the present invention includes an organic solvent, an ionizable lithium salt, a dinitrile compound including an ether bond represented by following Chemical Formula 1, and an aliphatic dinitrile compound represented by following Chemical Formula 2.

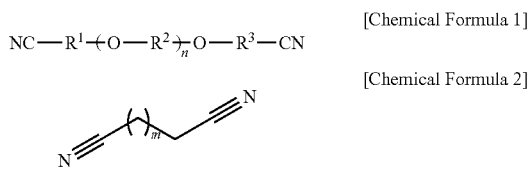

[Chemical Formula 1]

[Chemical Formula 2]

In Chemical Formulae 1 and 2, $R_1$, $R_2$ and $R_3$ independently represents an alkylene having 1 to 5 carbon atoms or an alkenyl having 2 to 5 carbon atoms, n represents an integer of 1 to 5, and m represents an integer of 1 to 3.

As described hereinafter, a compound including a vinylene group or a vinyl group, used in a non-aqueous electrolyte solution according to the present invention may form a passivating layer called as a solid electrolyte interphase (SEI) film on the surface of an anode during conducting an initial charging. The SEI layer may restrain the reduction decomposition of a carbonate used as a non-aqueous solvent to improve a charging/discharging efficiency and to exhibit a good cycle characteristic.

When the compound including the vinylene group or the vinyl group is used as the carbonate organic solvent, the thus formed SEI film may be thermally unstable and may be broken under an operation at a high temperature or a storage at a high temperature by an increased electrochemical energy and thermal energy. When the SEI film is unstable as described above, the deterioration of the performance of the battery, the decomposition of the electrolyte solution and the continuous generation of gas due to the breakage of the SEI film may be induced. In this case, the swelling phenomenon of increasing the internal pressure and the thickness of the battery may be generated. In addition, the decomposed and generated gas may deform the pouch type or the can type battery assembly to induce an internal short. In severe cases, the battery may ignite or be exploded.

The generation of the gas while storing a battery at a high temperature may increase as the amount of an additive forming a layer on an anode increases. Particularly, vinylene carbonate (VC) may form the SEI film on the anode in the beginning of the operation. Then, the VC remaining in the electrolyte solution may be oxidized at a cathode during storing at a high temperature to rapidly generate a gas. The generated gas may include CO, $CO_2$, $CH_4$, $C_3H_6$, etc.

The gas generation or the swelling phenomenon possibly generated by adding the compound including the vinylene group or the vinyl group into the non-aqueous electrolyte solution and by storing at a high temperature may be prevented by adding a dinitrile compound having an ether bond represented by Chemical Formula 1 above.

The organic solvent used in the non-aqueous electrolyte solution of the lithium secondary battery may be oxidized and decomposed at the surface of the cathode during charging/discharging. Particularly, when a lithium transition metal oxide is used as the cathode active material, the transition metal may function as an oxidizing agent, the decomposition of the electrolyte solution may be promoted. However, according to the present invention, the dinitrile compound having the ether bond represented by Chemical Formula 1 may form a complex at the surface of the cathode including a lithium-transition metal oxide. Thus, the oxidation reaction of the electrolyte solution and the anode may be restrained and heating may be restrained. In addition, the internal short due to the rapid increase of the temperature of the battery may be prevented.

Various compounds may be present in the non-aqueous electrolyte solution during charging/discharging. Among the compounds, HF, $PF_6$, etc. may make the non-aqueous electrolyte solution acidic. In the acidic solution, the oxidization reaction at the surface of the cathode of the non-aqueous electrolyte solution may be accelerated. However, oxygen (—O—) included in the ether group of the dinitrile compound including the ether bond represented by Chemical Formula 1 may make a bond with HF, $PF_6$, etc. in the non-aqueous electrolyte solution. Thus, the forming of the acidic solution may be prevented to restrain the acceleration of the oxidation and decomposing reaction of the non-aqueous electrolyte solution.

Further, the dinitrile compound having the ether bond represented by Chemical Formula 1 may illustrate an improved effect in the performance of the battery when comparing with the common additives. Particularly, a capacity retention ratio may be good, and a battery having an improved charging/discharging cycle lifetime property and a good electrochemical property may be provided.

The dinitrile compound having the ether bond represented by Chemical Formula 1 may be at least one selected from the group consisting of 3,5-dioxa-heptanedinitrile, 1,4-bis(cyanoethoxy)butane, bis(2-cyanoethyl)-monoformal, bis(2-cyanoethyl)-diformal, bis(2-cyanoethyl)-triformal, ethylene glycol bis(2-cyanoethyl)ether, diethylene glycol bis(2-cyanoehtyl)ether, triethylene glycol bis(2-cyanoethyl)ether, tetraethylene glycol bis(2-cyanoethyl)ether, 3,6,9,12,15,18-hexaoxaeico acid dinitrile, 1,3-bis(2-cyanoethoxy)propane, 1,4-bis(2-cyanoethoxy)butane, 1,5-bis(2-cyanoethoxy)pentane and ethylene glycol bis(4-cyanobutyl)ether. Among the compounds, diethylene glycol bis(2-cyanoehtyl)ether may be preferably used.

The dinitrile compound having the ether bond may be included in an amount of 0.1 to 10% by weight based on the total amount of the electrolyte solution. When the amount of the dinitrile compound having the ether bond is less than 0.1% by weight, the swelling phenomenon may be insufficiently restrained, and when the amount exceeds 10% by weight, the cycle characteristic while charging/discharging at a high temperature may be restrained, and a side reaction inhibiting the stability of the battery may be generated.

As described above, the restraining effect of the dinitrile compound having the ether bond on the swelling phenomenon while storing at a high temperature is excellent. The improving effect concerning the swelling when repeating the charging/discharging cycle at a high temperature may be further improved by adding an aliphatic dinitrile compound represented by Chemical Formula 2. That is, the restraining effect of the swelling of the battery while repeating the charging/discharging cycle may be remarkably improved by using the non-aqueous electrolyte solution including both the dinitrile compound having the ether bond and the aliphatic dinitrile compound represented by Chemical Formula 2, when comparing with the non-aqueous electrolyte solution including only the dinitrile compound having the ether bond. The aliphatic dinitrile compound represented by Chemical Formula 2 may restrain the decomposition of a carbonate organic solvent such as a linear carbonate or a cyclic carbonate and may restrain the generation of the gas of a decomposed product.

Among the aliphatic dinitrile compounds represented by Chemical Formula 2, succinonitrile is the most effective compound for restraining the decomposition of the carbonate organic solvent. The aliphatic dinitrile compound represented by Chemical Formula 2 may be included in an amount of 0.1 to 10% by weight based on the non-aqueous electrolyte solution.

The non-aqueous electrolyte solution in accordance with an example embodiment of the present invention may further include a compound including a vinylene group or a vinyl group possibly forming an SEI film at the surface of the anode in the beginning of the charging as described above. The compound including the vinylene group or the vinyl group, may be at least one selected from the group consisting of a vinylene carbonate compound, an acrylate compound including the vinyl group, a sulfonate compound including the vinyl group, and an ethylene carbonate compound including the vinyl group. Here, the vinylene carbonate compound may be vinylene carbonate.

The compound including the vinylene group or the vinyl group may be included in an amount of 1 to 3% by weight based on the total amount of the non-aqueous electrolyte solution.

Further, the non-aqueous electrolyte solution in accordance with an example embodiment of the present invention may further include a cyclic carbonate replaced with a halogen. The cyclic carbonate replaced with the halogen along with the compound including the vinylene group or the vinyl group may be used to even more effectively restrain the swelling phenomenon of the battery by improving the physical property of the SEI layer formed at the surface of the anode.

The cyclic carbonate replaced with the halogen may be a compound represented by following Chemical Formula 3.

[Chemical Formula 3]

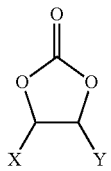

In Chemical Formula 3, each of X and Y independently represents hydrogen, chlorine or fluorine. Both of X and Y do not represent hydrogen at the same time.

The cyclic carbonate replaced with the halogen may be fluoroethylene carbonate (FEC). Further, when fluoroethylene carbonate is added into the non-aqueous electrolyte solution, the amount may be 1 to 5% by weight based on the total amount of the electrolyte solution.

In addition, the non-aqueous electrolyte solution in accordance with an example embodiment of the present invention may further include at least one additive selected from the group consisting of 1,3-propnane sultone, ethylene sulfate and N-acetyl lactam in order to form a stable SEI film at the surface of the electrode.

The ionizable lithium salt included in the electrolyte solution of the present invention may be at least one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$.

The organic solvent included in the non-aqueous electrolyte solution of the present invention may include commonly used organic solvents as the electrolyte for a lithium secondary battery without limitation. For example, at least one of an ether compound, an ester compound, an amide compound, a linear carbonate compound, a cyclic carbonate compound, etc. may be used.

Typically, the organic solvent may include the cyclic carbonate compound, the linear carbonate compound or a mixture carbonate compound thereof. The typical cyclic carbonate may be at least one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate and a halogenated compound thereof. The typical linear carbonate compound may be at least one selected from the group consisting of dimethyl carbonate (DMC), diethyl carbonate (DEC), dipropyl carbonate (DPC), ethyl methyl carbonate (EMC), methyl propyl carbonate (MPC), and ethyl propyl carbonate (EPC), without limitation.

Among the carbonate organic solvent, ethylene carbonate and propylene carbonate among the cyclic carbonate may be desirably used because they are organic solvents having a high viscosity and having a high dielectricity, and dissociate a lithium salt in the electrolyte solution well. When an appropriate amount of the linear carbonate having a low viscosity and a low dielectricity such as dimethyl carbonate and diethyl carbonate is mixed with the cyclic carbonate, an electrolyte solution having a high electric conductivity may be obtained and may be desirably used.

The ester compound among the organic solvent may be at least one selected from the group consisting of methyl acetate, ethyl acetate, propyl acetate, methyl propionate, ethyl propionate, γ-butyrolactone, γ-valerolactone, γ-caprolactone, σ-valerolactone and ϵ-caprolactone. However, the ester compound may not be limited to these compounds.

An electrode assembly including a cathode, an anode and a separator disposed between the cathode and the anode may be received in a battery container. Then, the non-aqueous electrolyte solution for the lithium secondary battery according to the present invention may be injected into the battery container to manufacture the lithium secondary battery. Commonly used cathode, anode and separator may be used for constituting the electrode assembly without limitation.

Particularly, a lithium containing transition metal oxide may be preferably used as the cathode active material and may be selected from the group consisting of a lithium-manganese oxide, a lithium-nickel-manganese oxide, a lithium-manganese-cobalt oxide and a lithium-nickel-manganese-cobalt oxide.

For example, at least one lithium containing metal oxide selected from the group consisting of $Li_xCoO_2$ ($0.5<x<1.3$), $Li_xNiO_2$ ($0.5<x<1.3$), $Li_xMnO_2$ ($0.5<x<1.3$), $Li_xMn_2O_4$ ($0.5<x<1.3$), $Li_x(Ni_aCo_bMn_c)O_2$ ($0.5<x<1.3$, $0<a<1$, $0<b<1$, $0<c<1$, $a+b+c=1$), $Li_xNi_{1-y}Co_yO_2$ ($0.5<x<1.3$, $0<Y<1$), $Li_xCo_{1-y}Mn_yO_2$ ($0.5<x<1.3$, $0≤Y<1$), $Li_xNi_{1-y}Mn_yO_2$ ($0.5<x<1.3$, $0≤Y<1$), $Li_x(Ni_aCo_bMn_c)O_4$ ($0.5<x<1.3$, $0<a<2$, $0<b<2$, $0<c<2$, $a+b+c=2$), $Li_xMn_{2-z}Ni_zO_4$ ($0.5<x<1.3$, $0<Z<2$), $Li_xMn_{2-z}Co_zO_4$ ($0.5<x<1.3$, $0<Z<2$), $Li_xCoPO_4$ ($0.5<x<1.3$) and $Li_xFePO_4$ ($0.5<x<1.3$) may be used. Besides the lithium containing transition metal oxide, a sulfide, a selenide, a halogenated compound, etc. may also be used.

As the anode active material, a metal oxide having a potential of 2 V or less with respect to lithium ions such as $TiO_2$, $SnO_2$ may be used. A carbon material may be preferably used. The carbon material may include low crystallized carbon and highly crystallized carbon. The low crystallized carbon may typically include soft carbon and hard carbon, and the highly crystallized carbon may typically include clacined carbon at a high temperature such as natural graphite, artificial graphite, kisi graphite, pyrolytic carbon, mesophase pitch based carbon fiber, meso-carbon micro-beads, mesophase pitch and petroleum or coal tar pitch derived cokes, etc.

The cathode and/or the anode may include a binder. The binder may include an organic binder such as vinylidene-fluoride-hexafluoropropylene copolymer, polyvinylidene-fluoride, polyacrylonitrile, polymethyl methacrylate, etc. and an aqueous binder such as styrene-butadiene rubber, etc. along with a viscosity increasing agent such as carboxymethyl cellulose. Preferably, the aqueous binder exhibiting a good adhesiveness even when using a relatively small amount may be used.

The separator may include a porous polymer film, which is a commonly used separator. The porous polymer film manufactured from polyolefin polymer such as an ethylene homopolymer, a propylene homopolymer, an ethylene/butene copolymer, an ethylene/hexane copolymer and an ethylene/methacrylate copolymer, etc. may be used. The porous polymer film may be used alone or as a laminated shape using them. Alternatively, a commonly used porous non-woven fabric, for example, a non-woven fabric of a glass fiber of a high melting point, a polyethyleneterephthalate fiber, etc. may be used without limitation.

The FIGURE of the battery container for receiving the lithium secondary battery may be any type without limitation and may include a cylinder type using a can, a polygon type, a pouch type, a coin type, etc. After assembling the battery, the non-aqueous electrolyte solution may be injected into the battery container.

Exemplary embodiments of the present invention will now be described in detail with reference to the preferred embodiments. It is noted that the exemplary embodiments may be modified into various other types, and the scope of the embodiments should not be interpreted as including only the following examples. The exemplary embodiments are provided to more completely explain the present invention to a person having an average knowledge in the art.

EXAMPLES

Hereinafter, examples and experiments will be described in more detail. However, the present invention may not be limited to the following examples and experiments.

Example 1

Preparation of Non-Aqueous Electrolyte Solution

Into a mixture solvent including an organic solvent of ethylene carbonate (EC):propylene carbonate (PC):diethyl carbonate (DEC)=3:2:5 by weight and 1.0 M of $LiPF_6$, 2% by weight of vinylene carbonate (VC), 3% by weight of 1,3-propanesultone (PS) and 3% by weight of fluoroethylene carbonate (FEC) based on the total amount of the electrolyte solution were added. Into the mixture solution, 1.5% by weight of ethylene glycol bis(2-cyanoethyl)ether (EGPN) and 5% by weight of succinonitrile were added to prepare a non-aqueous electrolyte solution.

[Manufacture of Lithium Secondary Battery]

$LiCoO_2$ as a cathode active material, polyvinylidene fluoride (PVdF) as a binder and carbon as a conductive material were mixed by a mixing ratio of 93:4:4 by weight. The mixture was dispersed in N-methyl-2-pyrrolidone to prepare a cathode slurry. The slurry was coated on an aluminum foil having a thickness of 15 μm, dried and rolled to manufacture a cathode.

An artificial graphite as an anode active material, a styrene-butadiene rubber as a binder and carboxymethyl cellulose as a viscosity increasing agent were mixed by a mixing ratio of 96:2:2 by weight. The mixture was dispersed in water to prepare an anode slurry. The slurry was coated on a copper foil having a thickness of 10 μm, dried and rolled to manufacture an anode.

Then, a pouch type battery was manufactured by using the thus manufactured cathode and anode, and a porous separator through a common method. The non-aqueous electrolyte solution was injected to complete a battery.

Example 2

A non-aqueous electrolyte solution and a lithium secondary battery were manufactured by conducting the same procedure described in Example 1 except for adding 3% by weight of ethylene glycol bis(2-cyanoethyl)ether.

Comparative Example 1

A non-aqueous electrolyte solution and a lithium secondary battery were manufactured by conducting the same procedure described in Example 1 except for preparing the electrolyte solution excluding succinonitrile.

Comparative Example 2

A non-aqueous electrolyte solution and a lithium secondary battery were manufactured by conducting the same procedure described in Example 2 except for preparing the electrolyte solution excluding succinonitrile.

Comparative Example 3

A non-aqueous electrolyte solution and a lithium secondary battery were manufactured by conducting the same procedure described in Example 1 except for preparing the electrolyte solution excluding ethylene glycol bis(2-cyanoethyl)ether.

Experiment 1

Test on Measuring Swelling on Storing at High Temperature

In order to evaluate the swelling of each battery according to Examples 1 and 2 and Comparative Examples 1 to 3 when storing at a high temperature, each of the batteries was stored in a 4.4 V over-charged state at 60° C. for 13 days. Then, the thickness change of each of the batteries was measured. The results on the swelling test were obtained as a maximum thickness change (Δt) with respect to an initial thickness for each battery and are illustrated in following Table 1.

TABLE 1

|  | Δt (mm) |
| --- | --- |
| Example 1 | 3.220 |
| Example 2 | 3.094 |
| Comparative Example 1 | 3.100 |
| Comparative Example 2 | 3.089 |
| Comparative Example 3 | 4.987 |

As known from Table 1, the thickness change of the battery using the non-aqueous electrolyte solution excluding ethylene glycol bis(2-cyanoethyl)ether according to Comparative Example 3 is found large when comparing with those of the batteries using the non-aqueous electrolyte solutions including ethylene glycol bis(2-cyanoethyl)ether according to Examples 1 and 2 and Comparative Examples 1 and 2. Thus, ethylene glycol bis(2-cyanoethyl)ether is found to have a restraining effect on the swelling phenomenon at a high temperature.

Experiment 2

Test on Measuring Swelling while Repeating Charging/Discharging Cycle at High Temperature Each of the lithium secondary batteries according to Examples 1 and 2 and Comparative Examples 1 to 3 was charged at the temperature condition of 60° C. with constant current of 0.7 C and 1,155 mA. After the voltage of the battery reached 4.35 V, a first time charging was conducted until the charge current reached 20 mA at constant voltage of 4.35 V. With respect to the firstly charged battery, discharging was conducted until the battery voltage reached 3 V at constant current of 1 C and 1,650 mA. Then, the discharge capacity and the thickness of a battery for the first cycle were measured.

In succession, the charging and discharging were repeatedly conducted for 400 cycles using each of the batteries according to Examples 1 and 2 and Comparative Examples 1 to 3, to measure the discharge capacity and the thickness at every 100 cycles. The results are illustrated in FIG. 1. The amount of a $CO_2$ gas generated after completing 400 cycles was separately measured. The results are illustrated in Table 2.

TABLE 2

|  | Amount of $CO_2$ (μL) |
| --- | --- |
| Example 1 | 1247.3 |
| Example 2 | 1110.9 |
| Comparative Example 1 | 3338.1 |
| Comparative Example 2 | 3211.5 |
| Comparative Example 3 | 1336.0 |

As shown in FIG. 1, the thicknesses of the batteries according to Examples 1 and 2 and Comparative Examples 1 to 3 are similar at $100^{th}$ cycle. However, as the cycle progressed, the increasing degree of the thickness of the battery becomes different. When examining the thickness increase between $100^{th}$ cycle to $400^{th}$ cycle, the thickness increase for the battery according to Examples 1 and 2 is confirmed to be the smallest. That is, the restraining effect of the swelling of the battery due to the charging/discharging at a high temperature is the best when using the electrolyte solution including both of ethylene glycol bis(2-cyanoethyl) ether and succinonitrile.

Referring to Table 2 above, the generating amount of $CO_2$ in the battery including only ethylene glycol bis(2-cyanoethyl)ether and excluding succinonitrile (Comparative Examples 1 and 2) is found to be remarkably large when comparing with the battery additionally including succinonitrile (Examples 1 and 2). Accordingly, the swelling of the battery while repeating the charging/discharging at a high temperature may be generated when using ethylene glycol bis(2-cyanoethyl)ether alone. In addition, the swelling of the battery due to the generation of the gas may be confirmed to be effectively controlled by succinonitrile added into the non-aqueous electrolyte solution.

While the present invention has been shown and described in connection with the exemplary embodiments, it will be apparent to those skilled in the art that modifications and variations can be made without departing from the spirit and scope of the invention as defined by the appended claims.

What is claimed is:

1. A non-aqueous electrolyte solution for a lithium secondary battery, comprising:
   an organic solvent;
   an ionizable lithium salt;
   a dinitrile compound including an ether bond; and
   an aliphatic dinitrile compound,
   wherein the dinitrile compound including an ether bond is ethylene glycol bis(2-cyanoethyl)ether, and the aliphatic dinitrile compound is succinonitrile;
   wherein the ethylene glycol bis(2-cyanoethyl)ether is included in an amount of 0.1 to 10% by weight based on a total amount of the electrolyte solution; and
   the succinonitrile is included in an amount of 0.1 to 10% by weight based on a total amount of the electrolyte solution.

2. The non-aqueous electrolyte solution for a lithium secondary battery of claim 1, further comprising a compound including a vinylene group or a vinyl group,
   the compound including the vinylene group or the vinyl group being at least one selected from the group consisting of a vinylene carbonate compound, an acrylate compound including the vinyl group, a sulfonate compound including the vinyl group, and an ethylene carbonate compound including the vinyl group.

3. The non-aqueous electrolyte solution for a lithium secondary battery of claim 1, further comprising fluoroethylene carbonate (FEC).

4. The non-aqueous electrolyte solution for a lithium secondary battery of claim 1, wherein the ionizable lithium salt is at least one selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$.

5. The non-aqueous electrolyte solution for a lithium secondary battery of claim 1, wherein the organic solvent includes a linear carbonate, a cyclic carbonate or a combination thereof.

6. The non-aqueous electrolyte solution for a lithium secondary battery of claim 5, wherein the linear carbonate is at least one selected from the group consisting of dimethyl carbonate, diethyl carbonate, dipropyl carbonate, ethyl methyl carbonate, methyl propyl carbonate, and ethyl propyl carbonate.

7. The non-aqueous electrolyte solution for a lithium secondary battery of claim 5, wherein the cyclic carbonate is at least one selected from the group consisting of ethylene carbonate, propylene carbonate, 1,2-butylene carbonate, 2,3-butylene carbonate, 1,2-pentylene carbonate, 2,3-pentylene carbonate, vinylene carbonate and a halogenated compound thereof.

8. A lithium secondary battery, comprising:
   an electrode assembly including a cathode including a cathode active material, an anode and a separator interposed between the cathode and the anode;
   a battery container receiving the electrode assembly; and
   a non-aqueous electrolyte solution injected into the battery container,
   the non-aqueous electrolyte solution being the non-aqueous electrolyte solution according to claim 1.

9. The lithium secondary battery of claim 8, wherein the anode includes an aqueous binder.

10. The lithium secondary battery of claim 8, wherein the cathode active material is selected from the group consisting of a lithium-manganese oxide, a lithium-nickel-manganese oxide, a lithium-manganese-cobalt oxide and a lithium-nickel-manganese-cobalt oxide.

* * * * *